United States Patent [19]

Heider et al.

[11] Patent Number: 4,923,210
[45] Date of Patent: May 8, 1990

[54] SUSPENSION AND LEVELING SYSTEM FOR A VEHICLE

[76] Inventors: Merle J. Heider, 203-12th St., SW.;
Dale J. Heider, 1108-8th Ave., SW.;
Leon J. Heider, R.R., all of
Humboldt, Iowa 50548

[21] Appl. No.: 329,441

[22] Filed: Mar. 28, 1989

[51] Int. Cl.$^5$ ...................... B62D 37/00; B60G 11/26
[52] U.S. Cl. ...................................... 280/707; 180/41;
280/712; 280/840
[58] Field of Search ....................... 280/840, 6.12, 707,
280/712; 180/41

[56] References Cited

U.S. PATENT DOCUMENTS

| | | | |
|---|---|---|---|
| 2,949,316 | 8/1960 | Davies et al. | 280/1 |
| 3,181,877 | 5/1965 | McHenry | 280/1 |
| 3,784,221 | 1/1974 | Frasier, Sr. | 280/124 |
| 3,836,161 | 9/1974 | Buhl | 280/6 |
| 3,917,307 | 11/1975 | Shoebridge | 280/104 |
| 4,580,798 | 4/1986 | Roelofs | 280/6 |
| 4,580,809 | 4/1986 | Leaf | 280/712 |
| 4,641,843 | 2/1987 | Morrisroe, Jr. | 280/6 |
| 4,722,547 | 2/1988 | Kishi et al. | 280/707 |
| 4,817,922 | 4/1989 | Hovance | 280/840 |
| 4,822,063 | 4/1989 | Yopp et al. | 280/707 |
| 4,836,578 | 6/1989 | Soltis | 280/840 |

FOREIGN PATENT DOCUMENTS 2141677 1/1985 United Kingdom .

Primary Examiner—Richard A. Bertsch
Attorney, Agent, or Firm—Zarley, McKee, Thomte, Voorhees & Sease

[57] ABSTRACT

The suspension system of the present invention includes an elongated spring having one end attached to the vehicle frame and having a second end. A pneumatic bag includes an upper end which is attached to the vehicle frame and a lower end. A securing bracket attaches the lower end of the bag and the second end of the elongated spring to the axle so that the weight of the vehicle frame above the axle is supported in combination by the spring and the air bag. A pneumatic control system is in communication with the bag for selectively introducing air to the bag so as to control the pressure within the bag and thereby control the height that the bag supports the vehicle frame above the axle. A stabilizer bar is pivotally connected at one end of the vehicle frame and at the other end to the axle so as to cause the vehicle frame to be centered over the axle while at the same time permitting the vehicle frame to move vertically with respect to the axle. The control means includes both manual controls and automatic photo-electric sensors for controlling the height of the frame above the axle.

14 Claims, 4 Drawing Sheets

SUSPENSION AND LEVELING SYSTEM FOR A VEHICLE

BACKGROUND OF THE INVENTION

The present invention relates to a suspension and leveling system for a vehicle.

Many vehicles include suspension systems which are controlled by shock absorbers and by leaf springs. In many heavy systems such as found in motor homes, the ride provided by shock absorbers and leaf springs is rough, and not satisfactorily smooth.

It is also desirable with motor homes to be able to level the motor home after it has been parked in a position for use overnight.

Therefore, a primary object of the present invention is the provision of an improved suspension system for a vehicle.

A further object of the present invention is the provision of an improved suspension system which can be adapted to the present suspension systems found in many vehicles.

A further object of the present invention is the provision of an improved suspension system which provides a smooth pneumatic suspension system for supporting the vehicle while it is being driven.

A further object of the present invention is the provision of a suspension system which can be adapted to present vehicles by altering or removing the leaf springs currently found on present vehicles.

A further object of the present invention is the provision of a suspension system which permits the selective leveling of the device as desired.

A further object of the present invention is the provision of a suspension system which includes automatic photo-electric sensors for automatically leveling the system if desired.

A further object of the present invention is the provision of a pneumatic air bag suspension system which includes also an accumulator tank for accumulating condensation which occurs within the pneumatic system during increases and decreases of atmospheric pressure.

A further object of the present invention is the provision of a pneumatic air bag suspension system which also includes an accumulator tank for increasing the effective volume of air which is compressed within the air bag so as to create a softer suspension.

A further object of the present invention is the provision of a suspension system which includes a radius rod for providing horizontal stability to the axle with respect to the vehicle.

A still further object of the present invention is the provision of an air suspension system which is economical to manufacture, efficient in operation and simple to install.

SUMMARY OF THE INVENTION

The present invention can be adapted to a vehicle having a conventional leaf spring suspension system. The leaf spring is cut in half, and the rear half of the leaf spring is removed. An air bag is mounted between the cut off end of the leaf spring and the vehicle frame. The air bag is supplied by a pneumatic system which includes an accumulator tank attached to the vehicle frame and in fluid communication with the air bag.

Means are provided in the pneumatic system for varying the air pressure of the air within the air bag and the accumulator tank. This permits the adjustment of the height of the vehicle frame above the axle.

The accumulator tank increases the softness of the ride. The accumulator tank is connected to the air bag so that as air is compressed in the bag, it also is compressed in the accumulator tank, resulting in a softer ride. The accumulator tank also includes a drain valve, and any condensation which results from variance in the air pressure, will accumulate in the accumulator tank and can be drained by opening the drain valve.

The accumulator tank enhances the softness of the ride by enlarging the effective volume of the air bag. This is desirable, because the diameter of the air bag is limited, thereby limiting the ability to provide the proper air volume to create the desired softness of ride.

A stability rod is attached at one end to the vehicle frame and extends transversely of the vehicle frame to the point where it is connected to the axle. This stabilizer rod permits the axle to move vertically with respect to the vehicle frame, but holds the vehicle frame in centered relation over the axle so that it does not move laterally with respect to the axle.

A control system is provided for controlling the pressure within the air bag. The control system includes electrical switches which can be mounted within the vehicle cab. The switches are connected to various valves in the pneumatic system which supplies the air bag. The control system can be placed in an automatic mode which employs photo-electric sensors for maintaining a constant distance between the vehicle frame and the axle in response to variations in load distributions within the vehicle. The control system can also be placed in a manual mode for leveling the vehicle when it is parked on an uneven supporting surface.

DETAILED ION OF THE DRAWINGS

Figure 1:
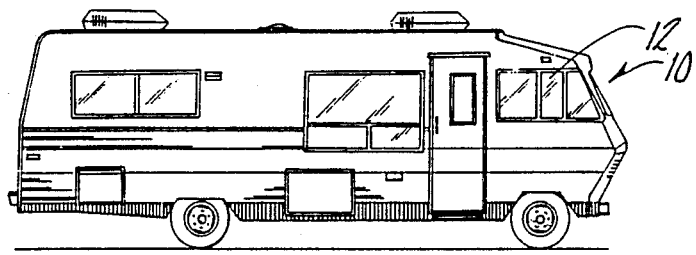
FIG. 1 is a side elevational view of a motor home.

Referring to the drawings, the numeral 10 generally designates a motor vehicle as shown in FIG. 1. Vehicle 10 includes a vehicle cab 12, a vehicle frame 14 having two side members 16 and 18, and a number of cross members 20. Vehicle 12 also includes an axle 22 which extends transversely of the vehicle frame 14 and which is positioned below vehicle frame 14.

A leaf spring 24 includes a first end 26 which is pivotally connected to vehicle side frame 16 for pivotal movement about an axis 28. Leaf spring 24 is shown to be severed at its approximate middle so as to create a second free end 30. The remaining portion of the leaf spring found originally on the vehicle is discarded, leaving only the portion which terminates at end 30.

An air bag 32 includes an upper bag frame 34 which is attached to vehicle frame member 16 by means of bolts 35.

Figure 6:
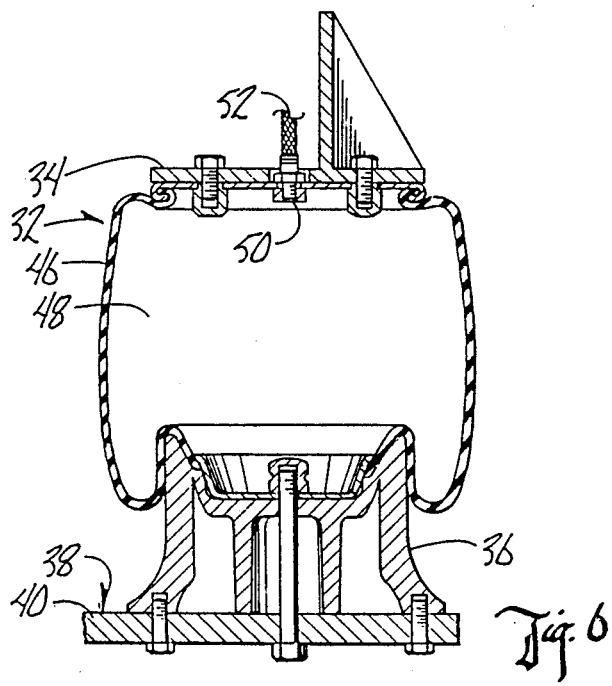
FIG. 6 is a sectional view taken along line 6—6 of FIG. 3.

Air bag 32 also includes a lower bag frame 36 which is adapted to be connected to a Z-shaped mounting plate 38 having a lower horizontal plate member 40, a vertical plate member 42, and an upper horizontal plate member 44. Located between upper bag frame 34 and lower bag frame 36 is a flexible rubber bag 46 which defines an air bag compartment 48 (FIG. 6). In communication with air bag compartment 48 is an inlet opening 50 which is connected to an air hose or conduit 52.

Prior to the modification of the suspension system of the vehicle, the axle 22 is attached to the leaf spring 24 by means of a pair of U-shaped clamps 54 which extend through leaf spring 24 and which also extend through a pair of axle brackets 56, 58 which surround axle 22. The U-shaped bolts 54 are tightly secured to leaf spring 24 and axle brackets 56, 58 by means of nuts 60 which are threaded on the lower ends of U-shaped bolts 54.

Figure 3:
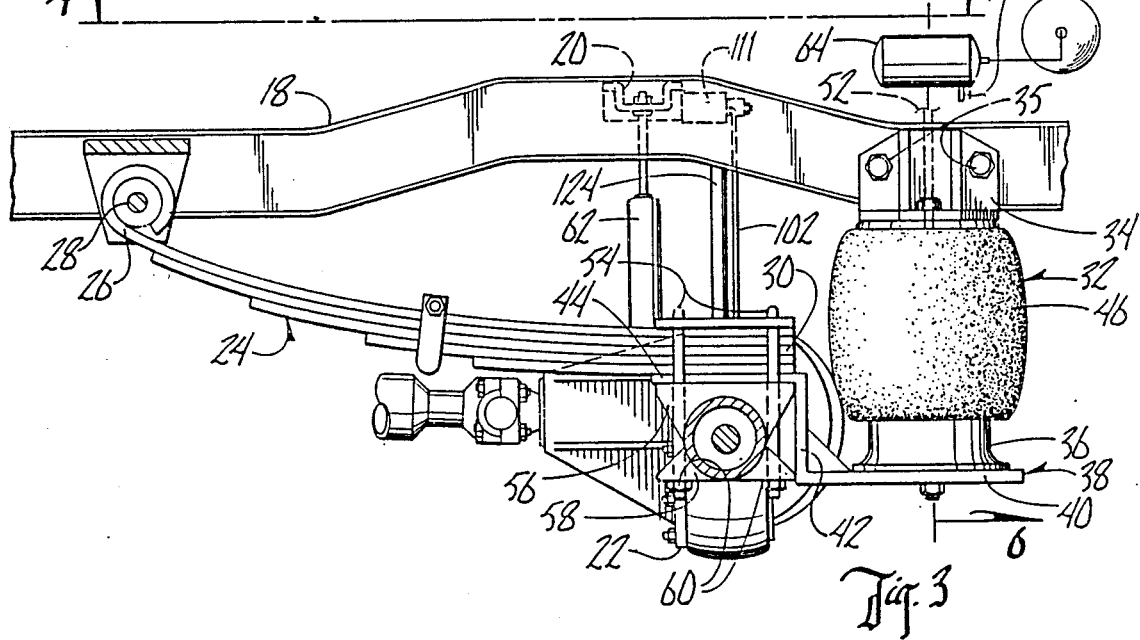
FIG. 3 is a sectional view taken along line 3—3 of FIG. 2.
Figure 4:
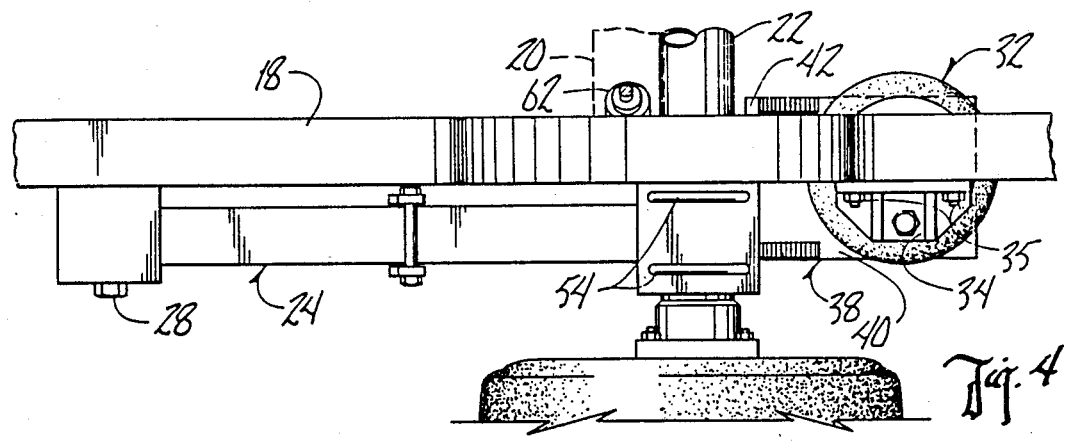
FIG. 4 is a partial top plan view taken along line 4—4 of FIG. 3, but showing only one-half of the vehicle frame.

In modifying a conventional suspension system to provide the present invention, the U-shaped bolts 54 are loosened, and the upper horizontal plate 44 is inserted between the leaf spring 24 and the axle brackets 56 as shown in FIG. 3. Then the nuts 60 are tightened, thereby securing the lower bracket 36, and the second end 30 of spring 24, rigidly to the axle 22 as shown in FIG. 3. This causes the weight of the vehicle frame to be borne jointly by the spring 24 and the air bag 32. The axle is also partially supported by conventional shock absorbers 62. Approximately 80% of the load from frame 14 is borne by air bag 32.

Air hose 52 leads from air bag 32 to an accumulator tank 64 which is mounted to vehicle frame 16 and which includes a condensation drain valve 66 therein. In FIG. 3, accumulator tank 64 is schematically shown in reduced scale. Preferably the accumulator tank 64 should have a volume equal to or greater than bag compartment 48. Accumulator tank 64 provides two functions. First, it adds to the effective volume of air compressed within air bag 32, thereby enhancing the smoothness of ride provided by air bag 52 while the vehicle is moving over a supporting surface. Also, accumulator tank 64 acts as an accumulation point for condensation which forms in the pneumatic system, and drain valve 66 permits the draining of this condensation from the system. This is important because conventional air bags such as air bag 32 do not normally provide for removal of condensation.

Figure 10:
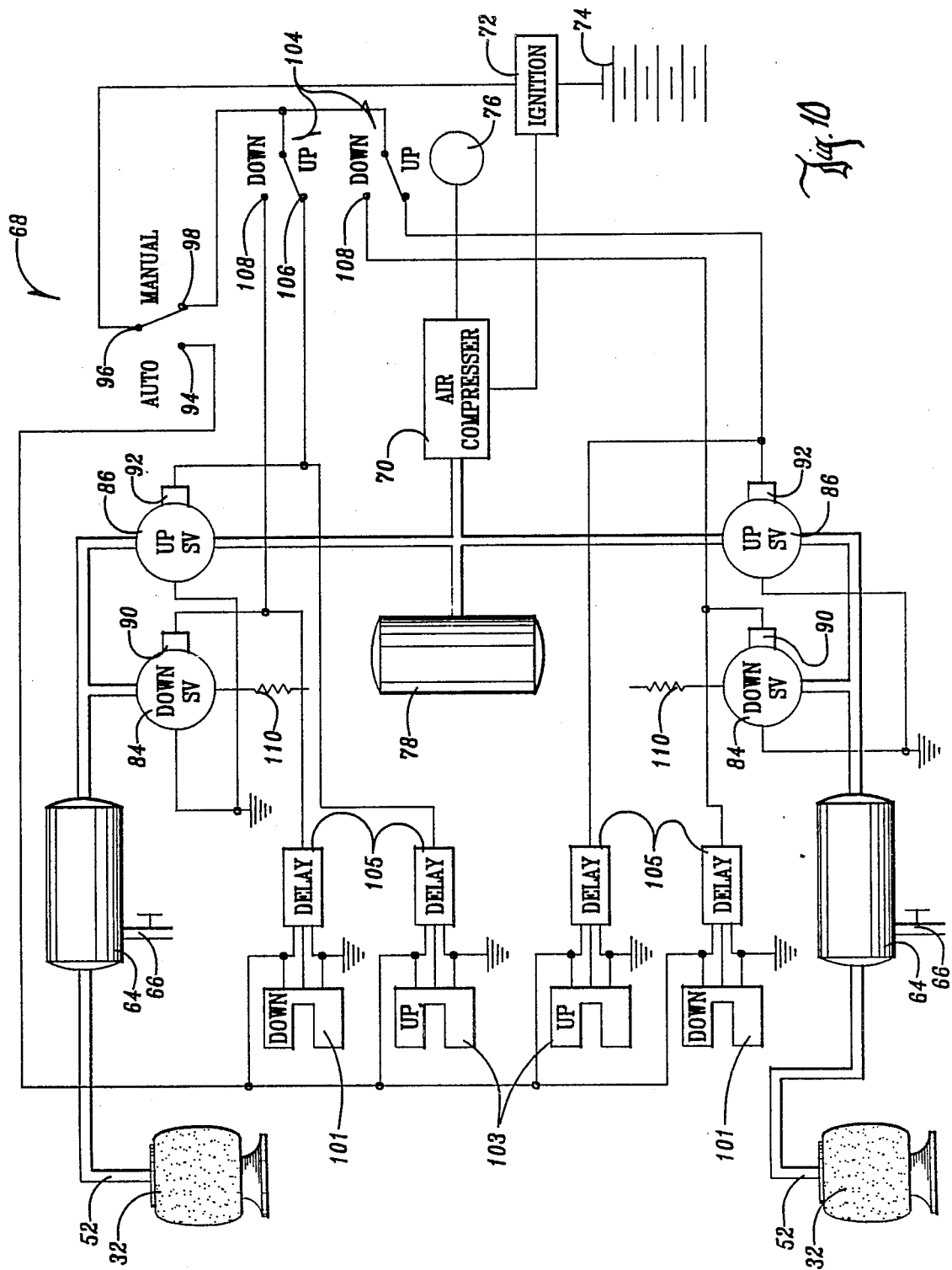
FIG. 10 is a schematic diagram showing the pneumatic and electrical circuitry for the present invention.

An air control system is shown schematically in FIG. 10 and is designated generally by the numeral 68. Control system 68 includes an air compressor 70 which is electrically connected to the ignition 72 for receiving power from the vehicle battery 74. A pressure gauge 76 is connected to air compressor 70 and is mounted within the cab 12 of vehicle 10 for monitoring by the operator.

Air compressor 70 is fluidly connected to a pressure tank 78 which in turn is connected to a pneumatic line which includes a pair of down valves 84, and a pair of up valves 86. This line is connected pneumatically to the accumulator tanks 64 which in turn are connected by hoses 52 to air bags 32. Each of the down valves 84 are connected to a down valve solenoid 90, and each of the up valves 86 is connected to an up valve solenoid 92.

The operation of the down valves 84 and up valves 86 is controlled by an electrical circuit, including a master control switch 96 which is movable between a first terminal 94 and a second terminal 98. The electrical circuit also includes a pair of down sensors 101 and a pair of up sensors 103. A time delay 105 is included for each sensor 101, 103.

Figure 2:
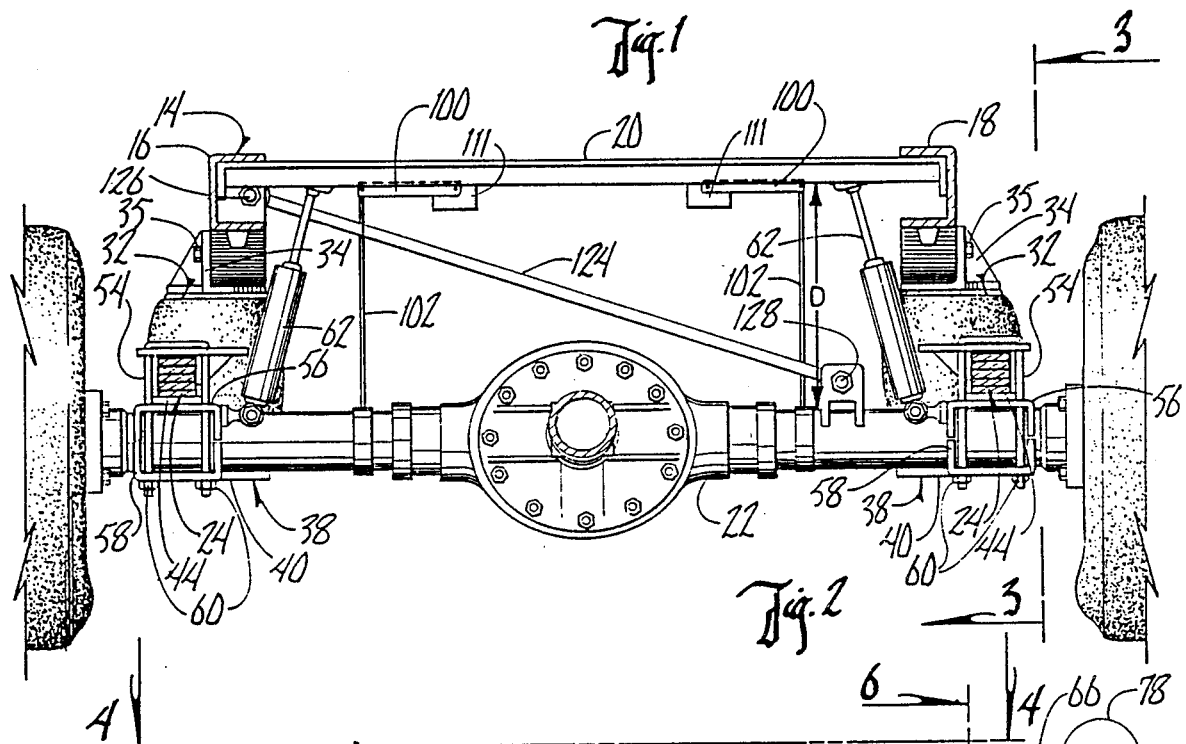
FIG. 2 is a sectional view through a motor home showing the axle and suspension system of the present invention.
Figure 7:
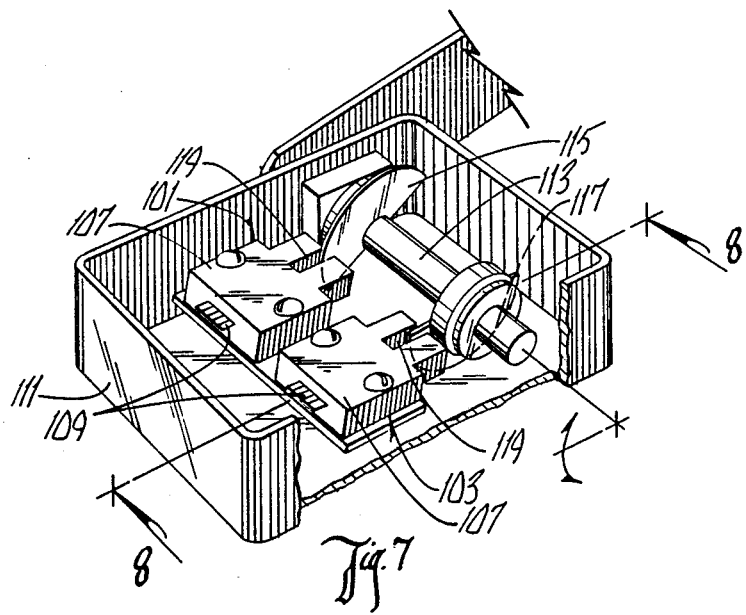
FIG. 7 is a perspective view of the photo-electric sensor of the present invention.
Figure 8:
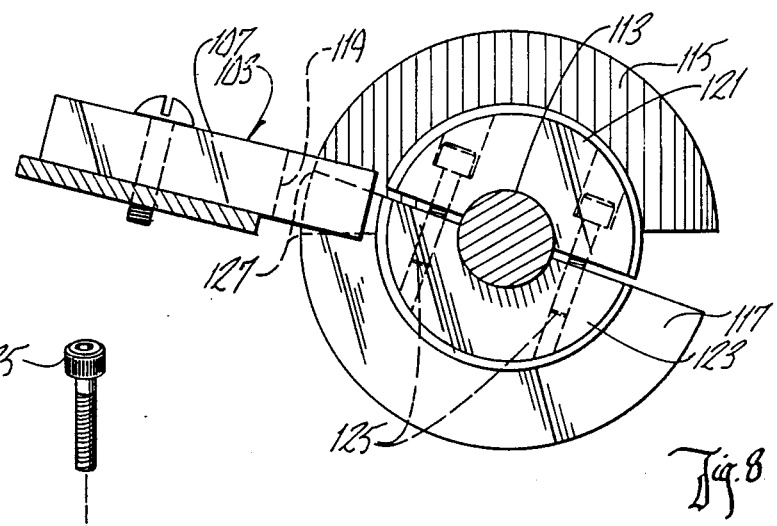
FIG. 8 is a sectional view taken along lines 8—8 of FIG. 7.
Figure 9:
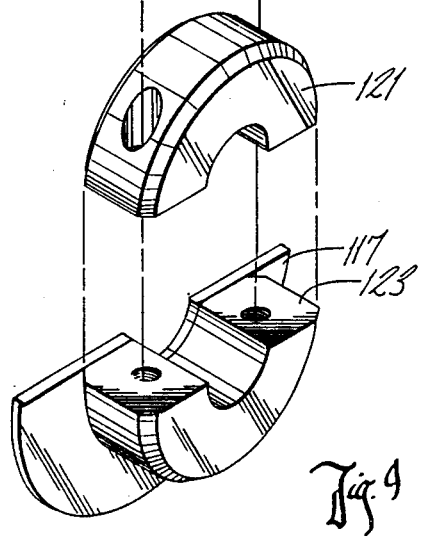
FIG. 9 is an exploded perspective view of one of the cams in the photo-electric sensor.

The details of sensors 101, 103 are shown in FIGS. 7-9. More particularly, each sensor includes a photoelectric cell 107 having terminals 109 for connection in the electrical circuit. Preferably, one down sensor and one up sensor is mounted within a housing 111 on each side of the vehicle, as seen in FIG. 2. Rotatably mounted in housing 111 is a shaft 113 having a down cam 115 and an up cam 117 secured thereto. Each cam extends into the gap or slot 119 in the respective photoelectric cell across which the light therefrom passes.

Cams 115, 117 are mounted on shaft 113 by means of a split collar having two halves 121, 123 which are secured to shaft 113 by set screws 125 or the like, as best seen in FIGS. 8 and 9. Cams 115, 117 are mounted upon shaft 113 so as to slightly overlap one another, as indicated by area 127 in FIG. 8.

The shaft 113 is connected to a first mechanical link 100, which in turn is pivotally connected to a second link 102. The lower end of link 102 is attached to axle 22. Thus, as the distance between axle 22 and vehicle frame member 20 increases or decreases, the linkage 100, 102 causes the shaft 113 to be rotated clockwise or counterclockwise. Cams 115, 117 rotate accordingly with shaft 113.

Thus, depending on the direction of rotation of shaft 113, either down cam 115 or up cam 117 will move out of its normal light-blocking position with respect to the photo-electric cell 107. With the light free to pass across the photo-electric cell gap 119, with the electric circuit through that cell is thus completed.

When switch 96 is in contact with terminal 94, the electrical system is in the automatic mode. In this case, down sensors 101 and up sensors 103 are activated. Accordingly, when axle 22 is not level, linkages 100, 102 rotate shaft 113 and cams 115, 117, and thereby complete the circuit through one of the cells 107 of either down sensor 101 or up sensor 103. The completed circuit thus actuates the associated down valve 84 or up valve 86 to release pressure from or increase pressure to air bag 32, via accumulator tank 64.

In the automatic setting, valves 84 and 86 are normally closed. Upon opening of one of sensors 101 or 103, the respective valve 84 or 86 is opened so as to lower or raise the pressure in the respective air bag 32.

The cams 115, 117 are adapted to be moved to their open position whenever the distance D between vehicle frame 20 and axle 22 changes. For example, when cam 115 or 117 is opened by means of linkage 100, 102, air pressure is introduced form the pressure tank 78 to the air bags 32, thereby causing the air bags 32 to function as a pneumatic cylinder for raising the vehicle frame until the desired distance D is achieved. When the preselected desired distance D is achieved, the linkage 100, 102 senses this difference, rotates the cams to their normal closed position, thereby preventing any further pressure from being introduced to air bag 32.

As can be seen in FIGS. 2 and 3, the left and right sets of sensors operate independently of one another, thereby permitting either the left or right hand side of the vehicle to be raised or lowered as desired. The sensitivity of sensors 101, 103 can be adjusted by varying the amount of overlap area 127 between cams 115 and 117.

An example of the photo-electric cell 107 which is preferred for the present invention is manufactured by Omcron Electronics, Inc., 1 East Commerce Drive, Schaumburg, Illinois 60173. An example of a time delay 105 which is preferred for the present invention is manufactured by Micro Matic Division, Milwaukee Electronics Corp., 7817 West Clinton Avenue, Milwaukee, Wisconsin 53223. The timer 105 is capable of providing a three to five second time delay so that the sensor will not respond to normal jostling or bumping during riding, but will only respond to a permanent change in the distance D which lasts longer than three to five seconds.

Referring again to the schematic of FIG. 8, the device may be changed from an automatic mode to a manual mode by moving master control switch 96 from terminal 94 to terminal 98. This cause the deactives sensors 101, 103, thereby preventing automatic adjustment of the air pressure within air bags 32.

In the manual mode, the battery 74 is connected through master control switch 96 and terminal 98 to a pair of up-down switches 104. Up-down switches 104 are manually movable to an up position in connection with terminals 106. Switches 104 are also movable to a down position in connection with terminal 108. When switches 104 are in their up position, they cause solenoids 92 to move the up valves 86 to the air bags 32. Thus the operator can manually move valve 104 to the up position and cause a lifting of the particular bag desired so as to achieve leveling of the device. The two switches 104 permit independent operation of the two air bags 32. Up valves 86 are in their closed position except when switches 104 are in their up position in connection with terminals 106.

If it is desired to lower one side of the vehicle, the switches 104 are manually moved to the down position in connection with terminals 108. This causes solenoid 90 to move down control valve 84 to an open position wherein air can escape from air bag 32 through valve 84 outwardly to the atmosphere by means of an escape valve 110. Switches 104 are preferably toggle switches which are normally centered in a position out of contact with both terminals 108 and 106. Switches 104 can be manually moved either into contact with terminals 106 or terminals 108, as desired to raise or lower one particular side of the vehicle.

The automatic mode can again be placed in operation by moving master control switch 96 from the manual position in contact with terminal 98 to the automatic position in contact with terminal 94. This again activates the sensors 101, 103 to automate the system as previously described. At the same time, the down control valve 84 and the up control valves 92 automatically move to their closed positions.

Figure 5:
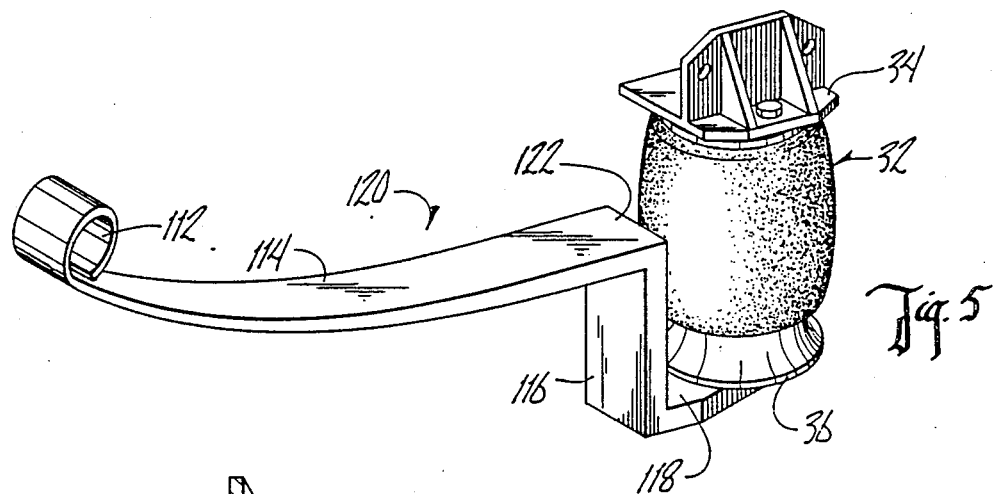
FIG. 5 is a perspective view of a modified form of the present invention.

Referring to FIG. 5, a modified form of spring can be used to replace the leaf spring 24. The modified form of spring includes a hinge 112 which can be connected to vehicle frame 16 in a fashion similar to that shown at 28 for leaf spring 24. Leaf spring 24 includes an upper arcuate portion 114, a vertical portion 116, and a lower horizontal portion 118. With the use of the member (designated generally by the numeral 120) in FIG. 5, it is possible to eliminate the Z-shaped member 38 shown in FIG. 3, and to directly connect the air bag 32 to the lower horizontal portion 118 of member 120 as shown in FIG. 5. Then U-bolts 54 are used to clamp the end 122 of arcuate portion 114 to the axle in a fashion similar to that shown for the leaf spring 24 of FIG. 3. The advantage of the use of member 120 is that a single continuous member extends from axis 28 to the lower end of air bag 32 whereas the configuration shown in FIG. 3 requires the use of an intermediate Z-shaped mounting plate 38.

The present invention provides many advantages. The steel leaf spring which normally provides the sole support for the axle, is replaced by the rubber air bag, thereby supporting the axle pneumatically and providing a smoother ride on the column of air provided by the air bag.

The device permits the compensation for load variations by permitting more air to be pumped into the bag when the load is increased, and by permitting the removal of air from the bag when the load is decreased.

The photo-electric sensors 101, 103 provide a constant maintenance of the distance from the frame to the axle, regardless of changes in the load distribution within the vehicle. The sensors on each side of the frame keeps the distance constant. This is done by the linkage 100, 102 which is hooked to the axle and the height control sensors which are connected to the frame. As the frame moves up and down, it either calls for more air and fills the air bag to raise the frame, or it calls for exhausting the air to let the frame down.

The air bag provides the large majority of the bearing of the load on the axle. It is positioned behind the axle so that it carries approximately 80% of the load.

In the modification shown in FIG. 3, the front half of the original leaf spring is kept. Some flexibility is still maintained in the front half of this spring. It has been found that the positioning of the air bag is shown in FIG. 3 slightly behind of the axle provides the maximum smoothness of ride. Furthermore, the use of a flexible member such as leaf spring 24 or such as member 120 also provides a smoother ride than if a rigid member is used.

The softness of ride is further enhanced by using the accumulation chamber 64. When the air is compressed within the air bag, it is also compressed in the accumulator chamber which results in a softer ride. The air from the compressor and the reserve air tank must first pass through the accumulator tank, and this permits any condensation to be trapped in the accumulator tank so as to minimize the accumulation of water in the air bag. A drain valve is provided at the bottom of the accumulator tank to permit condensation to be drained away.

A more desirable ride can be obtained by using the air bag in combination with the accumulator tank. This ride is more desirable than is obtained by increasing the diameter of the bag without using the accumulator tank. With the larger diameter bag, the air pressure within the bag is reduced, but doing this also reduces the spring rate and results in a rougher ride. By using the accumulator tank, it is possible to keep the air pressure within the air bag slightly higher, while at the same time providing a greater volume of air which can be compressed within the accumulator tank. This produces the desired softness of ride.

For lateral stability of the vehicle frame with respect to the axle, a radius rod 124 has one end pivotally connected to the vehicle frame 14 about horizontal axis 126 and has the opposite end connected to axle 22 for pivotal movement about horizontal axis 128. Stabilizer rod 124 is an elongated bar, and the opposite ends can be connected to the axle and frame respectively by solid rubber bushings on each end of the rod. The radius rod keeps the body of the vehicle directly centered over the axle. It is possible to split the radius bar longitudinally so that it can also be used as a torsion bar, thereby allowing for twist along its longitudinal axis.

The height of the vehicle remains constant. This is done by the height control photo-electric sensors which are mounted to the frame and which are connected to the axle by means of linkages 100, 102. As the load changes, it calls for either an increase of air in the air bags, or an exhausting of air from the air bags to maintain a preset height. The height control sensor has approximately a three to five second delay incorporated therein so as to prevent unnecessary reaction to holes and bumps in the road. It only responds to changes in the load on the vehicle which last longer than three to five seconds.

The system is supplied with a 12 volt air compressor that runs on demand by a pressure switch on the air tank.

The present device also provides a manual option which permits the leveling of the device when it is parked. In conventional devices, this is done by the use of hydraulic jacks which are located at the four corners of the vehicle.

The present invention converts the air bags into air cylinders which can raise and lower the opposite sides of the vehicle. In order to do this, the master switch is placed in the manual mode and the manual switches 104 are actuated either to raise or lower the sides of the vehicle.

One variation of the present invention comprises placing the height control photo-electric sensors on a slide which permits them to move vertically with respect to the frame. An electrical motor, worm gear, or other conventional electrical moving device can be used to raise and lower the height control sensors with respect to the frame. This will result in changing of the heights of the air bags when the system is in its automatic mode. The same result can be obtained by using extensible links which can be lengthened or shortened to cause the height control sensors to change the pressure within air bags 32.

Thus, it can be seen that the device accomplishes at least all of its stated objectives.

We claim:

1. A suspension system for a vehicle, said vehicle having a vehicle frame with forward and rearward ends and opposite lateral sides, said vehicle also having a vehicle cab and at least one axle extending transversely of said vehicle frame and having opposite axle ends positioned adjacent said opposite sides of said frame; ground engaging wheels being mounted on said axle, said suspension system comprising:

an elongated spring means having a first end attached to said vehicle frame and a second end;

bag means having an upper end, a lower end and flexible walls enclosing a bag compartment whereby said bag compartment is capable of continuously expanding and contracting in vertical size between expanded and retracted positions in response to the introduction of fluid to and removal of fluid from said bag compartment so as to adjust the vertical distance between said upper and lower ends of said bag means;

first securing means attaching said upper end of said bag means to said vehicle frame;

second securing means attaching said second end of said spring means and said lower end of said bag means to said axle whereby the vertical distance of said axle below said frame is controlled by the position of said bag compartment between said expanded and retracted positions;

a pressurized fluid source;

fluid conduit means connecting said fluid source to said bag means;

first and second valve means in said fluid conduit means for controlling the amount of pressure within said bag means, said first and second valve means being movable between a normally closed position and an open position;

photo-electric sensor means located externally of said bag compartment and being connected between said frame and said axle for sensing the relative distance therebetween, said sensor means being electrically connected to said first and second valve means for automatically moving said first and second valve means between said closed and open positions in response to changes in the distance between said frame and said axle.

2. The system of claim 1 further comprising manual control means electrically connected to said first and second valve means for selectively moving said first and second valve means between said closed and open positions.

3. The system of claim 1 further comprising switch means movable between first and second positions, said switch activating said sensor means when in said first position and activating said manual control means when in said second position.

4. The system of claim 1 wherein said sensor means includes first and second photo-electric cells, each having a light transmitting source and a light receiving portion, first and second cams normally positioned between said light transmitting source and said light receiving portion of said first and second cells, respectively, to define said closed position of said sensor, and means for moving said cams from said normal position to a second position remote from said light transmitting source and said light receiving portion of said cells.

5. The system of claim 4 wherein said means for moving said cams includes, a shaft upon which said cams are mounted, and linkage means extending between said frame and said axle and being secured to said shaft so as to rotate said shaft in response to changes in the distance between said frame and said axle, whereby rotation of said shaft in a clockwise direction moves one of said cams to said second position and rotation of said shaft in a counterclockwise direction moves the other of said cams to said second position.

6. The system of claim 1 further comprising time delay means electrically connected to said sensor means to allow movement of said valve means from said closed position to said open position only after the elapse of a predetermined interval of time.

7. A suspension system according to claim 1 wherein an accumulator chamber is in fluid connection with said bag compartment so as to enlarge the effective volume of air pressured within said bag compartment, said accumulator chamber being attached to said vehicle frame.

8. The system of claim 7 wherein said accumulator chamber is connected in series between said bag means and said valve means.

9. The system of claim 7 wherein said accumulator chamber includes a drain valve for draining condensation which may accumulate within said chamber.

10. A suspension system according to claim 1 wherein said control means is mounted within said cab of said vehicle.

11. A suspension system for a vehicle, said vehicle having a vehicle frame with forward and rearward ends and opposite lateral sides, said vehicle also having a vehicle cab and at least one axle extending transversely of said vehicle frame and having opposite axle ends positioned adjacent said opposite sides of said frame; ground engaging wheels being mounted on said axle, said suspension system comprising:

an elongated spring means having a first end attached to said vehicle frame and a second end;

bag means having an upper end, a lower end and flexible walls enclosing a bag compartment whereby said bag compartment is capable of continuously expanding and contracting in vertical size between expanded and retracted positions in response to the introduction of fluid to and removal of fluid from said bag compartment so as to adjust the vertical distance between said upper and lower ends of said bag means;

first securing means attaching said upper end of said bag means to said vehicle frame;

second securing means attaching said second end of said spring means and said lower end of said bag means to said axle whereby the vertical distance of said axle below said frame is controlled by the position of said bag compartment between said expanded and retracted positions;

a pressurized fluid source;

fluid conduit means connecting said fluid source to said bag means;

first and second valve means in said fluid conduit means for controlling the amount of pressure within said bag means, said first and second valve means being movable between a normally closed position and an open position;

photo-electric sensor means attached to said frame and being electrically connected to said first and second valve means for controlling movement of said first and second valve means between said closed and open positions;

linkage mechanism interconnecting said sensor means and said axle for causing said sensor means to automatically move said first and second valve means between said closed and open positions in response to changes in the distance between said frame and said axle.

12. A system according to claim 11 wherein said photo-electric sensor means comprises a movable member, a light transmitting cell and a light receiving cell, said movable member being movable from a first position blocking passage of light between said transmitting and said receiving cell to a second position permitting passage of light between said transmitting and said receiving cell.

13. A system according to claim 12 wherein said movable member comprises a rotatable shaft having at least one cam thereon, said cam blocking passage of light when said member is in said first position.

14. A system according to claim 13 wherein said sensor means comprises a second light transmitting cell and a second light receiving cell, said shaft having a second cam thereon movable in unison with said shaft, said second cam being positioned to block light passage between said second light transmitting and receiving cells when said shaft is in said first position and when said shaft is in said second position, said shaft being movable to a third position wherein said first mentioned cam blocks light passage between said first mentioned light transmitting and receiving cells and said second cam permits light passage between said second light transmitting and receiving cells.

* * * * *